US012434788B2

(12) United States Patent
Riedisser et al.

(10) Patent No.: US 12,434,788 B2
(45) Date of Patent: Oct. 7, 2025

(54) BOTTOM-BRACKET GEAR

(71) Applicant: ZF Friedrichshafen AG, Friedrichshafen (DE)

(72) Inventors: Thomas Riedisser, Sigmarszell (DE); Ulrich Doerr, Constance (DE); Peter Ziemer, Bad Woerishofen (DE); Leschek Debernitz, Eriskirch (DE); Christoph Margraf, Markdorf (DE); Hagen Doepfert, Lindau (DE); Uwe Schraff, Markdorf (DE); Uwe Griesmeier, Markdorf (DE); Michel Wiemer, Weingarten (DE); Markus Strobel, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/835,502

(22) PCT Filed: Feb. 1, 2023

(86) PCT No.: PCT/EP2023/052373
§ 371 (c)(1),
(2) Date: Aug. 2, 2024

(87) PCT Pub. No.: WO2023/148184
PCT Pub. Date: Aug. 10, 2023

(65) Prior Publication Data
US 2025/0145251 A1 May 8, 2025

(30) Foreign Application Priority Data
Feb. 3, 2022 (DE) .......................... 102022201131.7

(51) Int. Cl.
*F16H 57/03* (2012.01)
*B62M 11/14* (2006.01)
*B62M 25/00* (2006.01)

(52) U.S. Cl.
CPC .......... *B62M 11/145* (2013.01); *B62M 25/00* (2013.01)

(58) Field of Classification Search
CPC ..... B62M 11/145; B62M 25/00; F16D 41/12; F16D 41/30; F16H 57/10; F16H 55/17;
(Continued)

(56) References Cited

U.S. PATENT DOCUMENTS

2024/0343344 A1* 10/2024 Doepfert ................. F16H 63/30
2025/0155018 A1* 5/2025 Wiemer ................. F16H 61/32

FOREIGN PATENT DOCUMENTS

DE      602005000192 T2    9/2007
DE      102019220043 A1    6/2021
(Continued)

OTHER PUBLICATIONS

German Search Report for Application No. 102022201131.7 Dated Sep. 16, 2022.
(Continued)

*Primary Examiner* — Justin Holmes
(74) *Attorney, Agent, or Firm* — Dority & Manning, P.A.

(57) ABSTRACT

An arrangement for actuating a shift element for a bottom bracket gearbox (1) includes a shift ring (4) rotatably mounted in a housing (3) and assigned to a gearbox component. A shift pawl (5) for locking or releasing the shift ring (4) is assigned to the shift ring (4) for shifting a gear stage. A support region mechanically reinforces the housing (3) and is provided at least along a contact region (14) between an inner wall (8) of the housing (3) and an outer circumference of the shift ring (4). The contact region (14) is
(Continued)

defined by reaction forces (16) acting when the shift ring (4) is locked.

18 Claims, 3 Drawing Sheets

(58) Field of Classification Search
CPC .... F16H 57/028; F16H 57/03; F16H 63/3408; F16H 2055/176; F16H 2055/178; B60Y 2200/13; B60Y 2200/91
See application file for complete search history.

(56) References Cited

FOREIGN PATENT DOCUMENTS

| | | | | |
|---|---|---|---|---|
| DE | 102019220044 A1 | 6/2021 | | |
| EP | 2567888 A1 | 3/2013 | | |
| JP | H06263080 A | * | 9/1994 | .............. B62M 6/55 |
| WO | WO2019228725 A1 | 12/2019 | | |
| WO | WO-2023031158 A1 | * | 3/2023 | ............ B62M 11/06 |

OTHER PUBLICATIONS

Internation search report for Application No. PCT/EP2023/052373 Dated Apr. 14, 2023.

* cited by examiner

BOTTOM-BRACKET GEAR

CROSS-REFERENCE TO RELATED APPLICATIONS

The present application is related and has right of priority to German Patent Application No. DE 102022201131.7 filed on Feb. 3, 2022, and is a U.S. national phase of PCT/EP2023/052373 filed on Feb. 1, 2023, both of which are incorporated by reference in their entireties for all purposes.

TECHNICAL FIELD

The present invention relates generally to an arrangement for actuating a shift element for a bottom bracket gearbox, having a shift ring which is rotatably mounted in a housing and is assigned to a gearbox component. A shift pawl for locking or releasing the shift ring is assigned to the shift ring for shifting a gear stage. The invention further relates generally to a bottom bracket gearbox having the arrangement, and to a bicycle or pedelec having the bottom bracket gearbox.

BACKGROUND

For example, the publication DE 10 2019 220 044 A1 describes a bottom bracket gearbox in a planetary gear set design for a bicycle or a pedelec having an arrangement for actuating at least one brake shift element. The bottom bracket gearbox has multiple planetary gear sets for implementing various gear stages. Assigned to the bottom bracket gearbox are multiple brake shift elements, each of which has a brake ring that is assigned to a gearbox component and can be locked or released using a brake pawl in order to shift a predetermined, associated gear stage. The brake rings of the brake shift elements are each rotatably mounted in the housing of the bottom bracket gearbox. Each brake pawl assigned to a brake ring is actuated by a rotatably mounted shift drum, which is arranged approximately axially parallel to a central axis of rotation of the bottom bracket gearbox. To lock the brake ring, the brake pawl is brought into engagement with an outer toothing of the brake ring. Corresponding reaction forces occur at the brake pawl and at the brake ring as a result.

BRIEF SUMMARY

Example aspects of the present invention provide an arrangement for actuating a shift element, and a bottom bracket gearbox and a bicycle or pedelec, in which a sufficient counteraction of reaction forces at the housing can be ensured in a structurally simple and cost-effective manner when a shift ring is in the locked state.

Example aspects of the invention relate to an arrangement for actuating a shift element for a bottom bracket gearbox, the arrangement having a shift ring, which is rotatably mounted in a housing and is assigned to a gearbox component. A shift pawl for locking or releasing the shift ring is assigned to the shift ring for shifting a gear stage. In order to be able to cost-effectively and structurally simply counteract reaction forces on the housing side, which reaction forces occur when the shift ring is in the locked state, a support region which mechanically reinforces the housing is provided at least along a possible contact region between an inner wall of the housing and an outer circumference of the shift ring, which contact region results from reaction forces acting when the shift ring is locked.

In this way, in the arrangement according to example aspects of the invention, a mechanical reinforcement of the housing is provided at least in the region of the acting reaction force. As a result, the housing can be made, for example, of aluminum, for example, in a weight-saving manner, since the support region ensures the necessary mechanical stability at the housing. Therefore, not only can the service life of the arrangement be extended, but costs can also be reduced.

In order not to cause undesirable acoustic noises when the brake ring contacts the inner wall of the housing, it can be provided within the framework of example aspects of the present invention that the support region is provided with a damping region, which is effective with respect to acoustics. This can be, for example, a separate damping element, or even a suitable coating.

It is particularly preferable for the acoustic damping within the framework of example aspects of the invention when an elastomer or the like is used, which elastomer or the like has been, for example, vulcanized on the support region. As a result, the transmission of acoustic sound waves into the housing is sufficiently damped. In addition, the vulcanization of an elastomer can be carried out in a particularly cost-effective and simple manner.

The specific structural realization of the support region is possible in various ways. Within the framework of one possible example development of the invention, the support region can be provided in the form of a sleeve or the like, which is closed over the inner circumference of the housing in the region of the brake ring and is fastened to the inner wall of the housing. In this way, in addition to the radial support, a radial guidance of the shift ring in the housing is also achieved, since the sleeve is designed more or less as a support element, or sliding element, over the entire circumference and is fastened to the housing. Therefore, the external shift ring is radially centered and supported in the housing via the support region, which is in the form, for example, of a sleeve.

In order to fasten the support region which is in the form of a sleeve, it can be provided, for example, in the arrangement according to example aspects of the invention, that the sleeve is press-fit into the housing or is thermally integrated into the housing in order to fasten the sleeve directly in the housing without play.

According to another example embodiment of the invention, a coating or the like, which is provided on the inner wall of the housing and increases the surface hardness, is provided as a support region. Such a coating could be produced, for example, by hard anodization and, therefore, applied onto the entire inner wall or only onto the contact region of the inner wall of the housing.

A particularly cost-effective and structurally simple embodiment is achieved within the framework of example aspects of the invention by providing a ring segment-shaped push-in element or the like as a support region. Due to the example embodiment in the form of a ring segment or the like, precisely the region on the inner wall of the housing that is acted upon by the reaction force can be mechanically sufficiently reinforced, so that other parts of the housing can be made, for example, of low-weight aluminum or the like.

Preferably, the damping region, which is effective with respect to the acoustics, can be provided between the support element, or the push-in element, and the inner wall of the housing.

It is particularly advantageous when the ring segment-shaped push-in part is made of hardened spring steel or another elastic material more or less in the form of a spring clasp. Due to the elastic property of the push-in element, the curvature of the push-in element can be optimally adapted to the radius of the inner wall of the housing when the push-in element is fastened in the housing.

Preferably, the dimensions of the ring segment-shaped push-in element can be selected such that at least the contact region between the outer toothing of the shift ring and the inner wall of the housing is sufficiently covered, the contact region being situated at an angle of ninety degrees (90°) away from a touch region between the engaged shift pawl and the outer toothing of the shift ring. As a result, the dimensions can be optimally selected, so that optimized support is achieved with the arrangement according to example aspects of the invention.

In order to fasten the provided push-in element, a particularly cost-effective embodiment can be provided within the framework of example aspects of the invention, in which, for example, end portions of the ring segment-shaped push-in element are bent once and can be fastened in corresponding retaining grooves or the like on the inner wall of the housing. In this way, a secure, for example, friction-locking and/or interlocking fastening of the push-in element on the housing can be achieved without additional fasteners.

In the arrangement according to example aspects of the invention, in order to achieve an advantageous preload on the push-in element when installed in the housing, the retaining grooves are formed at a predetermined wedge angle with respect to the inner radius of the housing, so that the fastened push-in element is retained between end portions of the push-in element in the retaining grooves in a preloaded manner. Therefore, the push-in element is curved by the preloading, or wedging, and consequently pressed against the inner wall of the housing.

Particularly preferably, in the arrangement according to example aspects of the invention in the form of a shift element, a brake shift element having a rotatably mounted brake ring is used as a shift ring, which is lockable in one direction of rotation via a preferably single brake pawl in the form of a shift pawl.

A further example aspect of the present invention provides a bottom bracket gearbox having at least one above-described arrangement, resulting in the above-described advantages and further advantages. The bottom bracket gearbox can preferably be in a planetary gear set design and thus have multiple planetary gear sets, wherein predetermined gearbox components of the bottom bracket gearbox are assigned to the provided shift rings, or brake rings, in order to be able to shift appropriate gear stages in the bottom bracket gearbox.

A next example aspect of the present invention provides a bicycle or pedelec having the above-described bottom bracket gearbox, in which the above-described arranged is provided. This yields the above-described advantages and further advantages.

BRIEF DESCRIPTION OF THE DRAWINGS

Example aspects of the present invention are explained in greater detail in the following with reference to the drawings, wherein.

DETAILED DESCRIPTION

Figure 1:
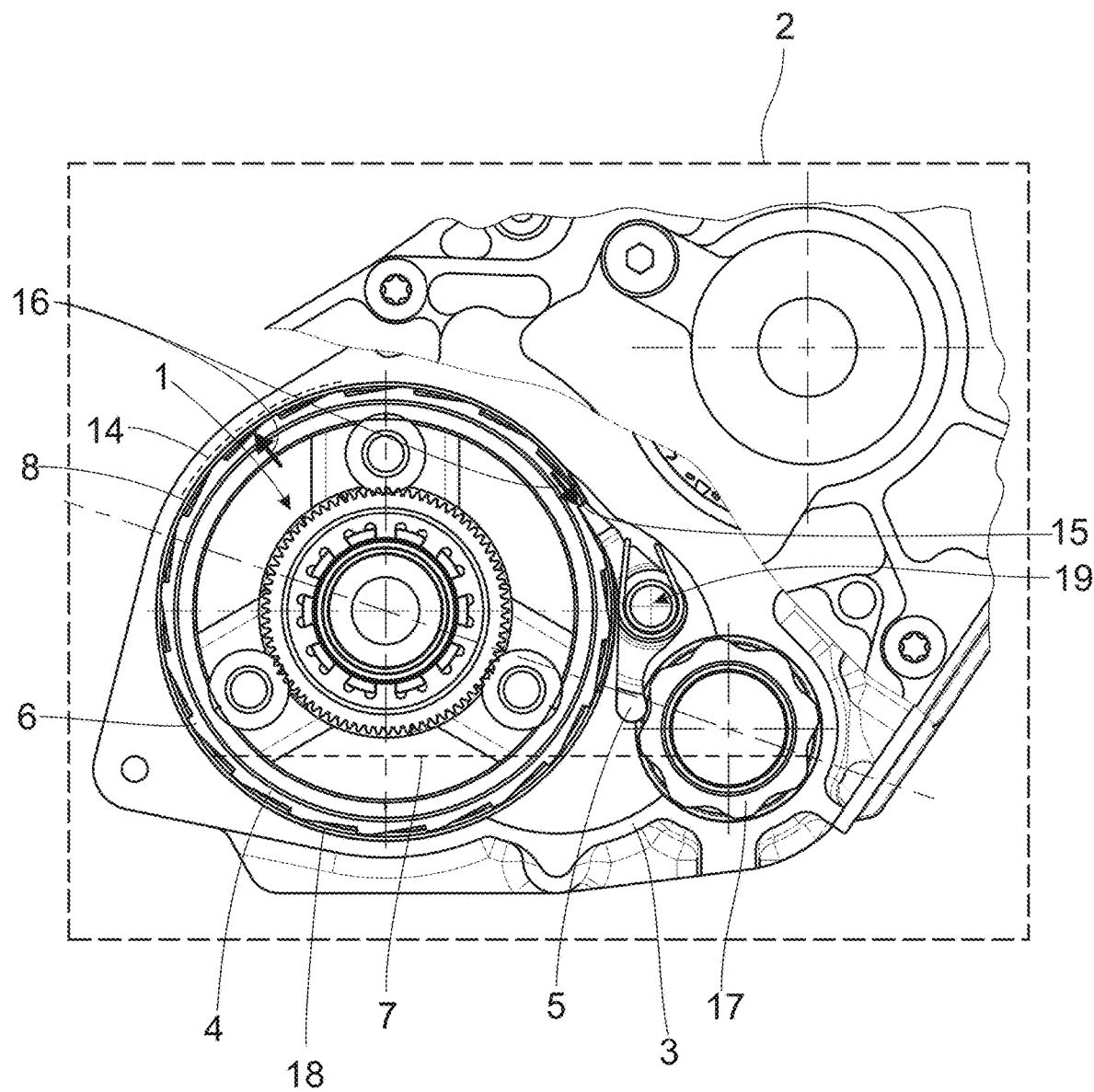
FIG. 1 shows a schematic sectional view of an arrangement according to example aspects of the invention in a bottom bracket gearbox of a bicycle or pedelec.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIGS. 1 through 4 various views of an arrangement according to aspects of the invention in a bottom bracket gearbox 1 of a bicycle or pedelec 2 are shown as examples. It is apparent from the part view that the bottom bracket gearbox 1 in a planetary gear set design is arranged in a housing, or bottom bracket housing 3, of the bicycle or pedelec 2. The arrangement is used to actuate a brake shift element, which is shown by way of example, in the form of a shift element of the bottom bracket gearbox 1.

The shift element, or brake shift element, has a brake ring 4, which is rotatably mounted in the housing 3, in the form of a shift ring. The brake ring 4 is locked in one direction of rotation or is released in both directions of rotation via a preferably single brake pawl 5 in the form of a shift pawl. The shift pawl 5, which is rotatably mounted in the housing 3 via a pin 19, is actuated by a shift drum 17 which is rotatably mounted in the housing 3. When the brake ring 4 is in the locked state in which the brake pawl 5 engages into an outer toothing 6 of the brake ring 4, a predetermined gear stage in the bottom bracket gearbox 1 is shifted. The brake ring 4 is radially guided and supported in a floating manner in the housing 3 over the outer circumference of the brake ring 4 and an inner diameter in the housing 3.

Figure 2:
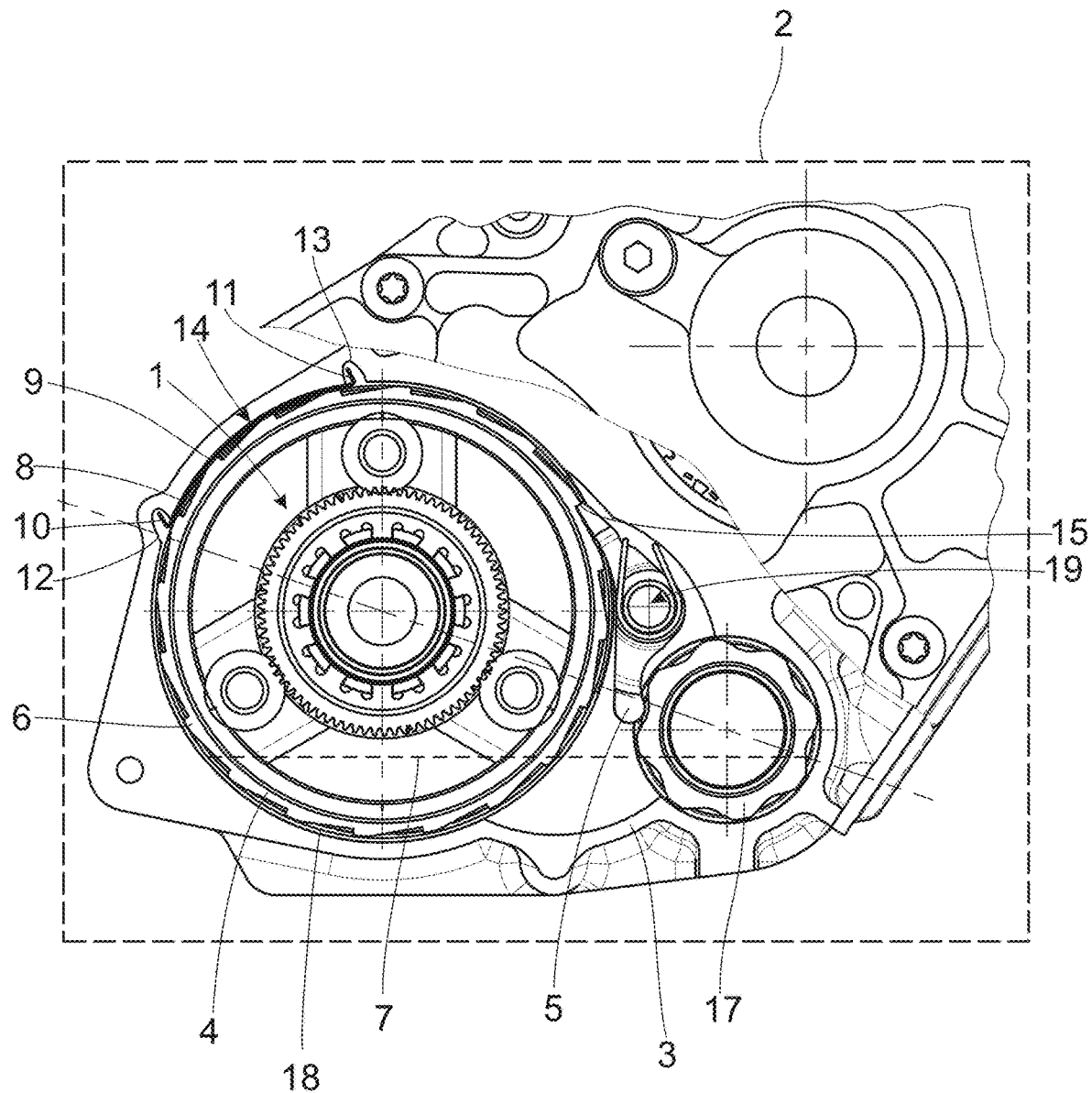
FIG. 2 shows a schematic sectional view of the arrangement with a push-in element as a support region on an inner wall of the housing.

As is apparent, in particular, from FIGS. 1 and 2, at least the lower region of the brake ring 4 is located directly in an oil sump 7 containing preferably low-viscosity oil, as a result of which the tribological contact region between the brake ring 4 and an inner wall 8 of the housing 3 is supplied with oil.

In order to reduce the wear and the elastic, or plastic, flexibility at the inner wall 8 of the housing 3, which is preferably made of aluminum, a support region which mechanically reinforces the housing 3 is provided at least along a contact region 14 between the inner wall 8 of the housing 3 and an outer circumference, or the outer toothing 6, of the brake ring 4 due to a reaction force 16 acting when the brake ring 4 is locked. The contact region 14, or the support region, is indicated in FIG. 1 by a dashed line on the circumferential region of the brake ring 4.

The indicated contact region 14 results due to the reaction forces 16 acting on the brake ring 4 and on the brake pawl 5 when the preferably single brake pawl 5 engages into the outer toothing 6 of the brake ring 4.

The contact region 14 is located circumferentially approximately ninety degrees (90°) away from the touch region 15 between the outer toothing 6 of the brake ring 4 and the engaged brake pawl 5. The reaction forces 16, which act on the brake pawl 5 and on the inner wall 8 of the housing 3, are indicated by arrows in FIG. 1. The reaction forces on the brake pawl 5 are transmitted via the pin 19 into the housing 3.

Therefore, it is apparent that the reaction forces 16 on the brake ring 4 during locking contact are pressed by the brake pawl 5 against the housing 3 for force compensation and, in fact, opposite the touch region 15 between the brake ring 4 and the preferably single brake pawl 5. This means that the brake ring 4 is always supported at the identical, locally delimited location on the inner wall 8 of the housing 3. The support region on the housing 3 according to example aspects of the invention is provided precisely at this contact region 14.

As the housing-side support region which increases the mechanical hardness of the housing 3, a closed sleeve 18 is provided on the housing wall 8 of the housing 3, the sleeve 18 being positioned with respect to the brake ring 4 coaxially or off-center by the average play between the brake ring 4 and the inner wall 8. The sleeve 18 is indicated in FIGS. 1 and 2. The prepositioning of the sleeve 18 off-center by the average play between the brake ring 4 and the inner wall 8 has the advantage that the brake ring 4, when rotationally fixed by the engaged brake pawl 5, is situated centrally with respect to the rotation axis of the bottom bracket gearbox 1.

Figure 3:
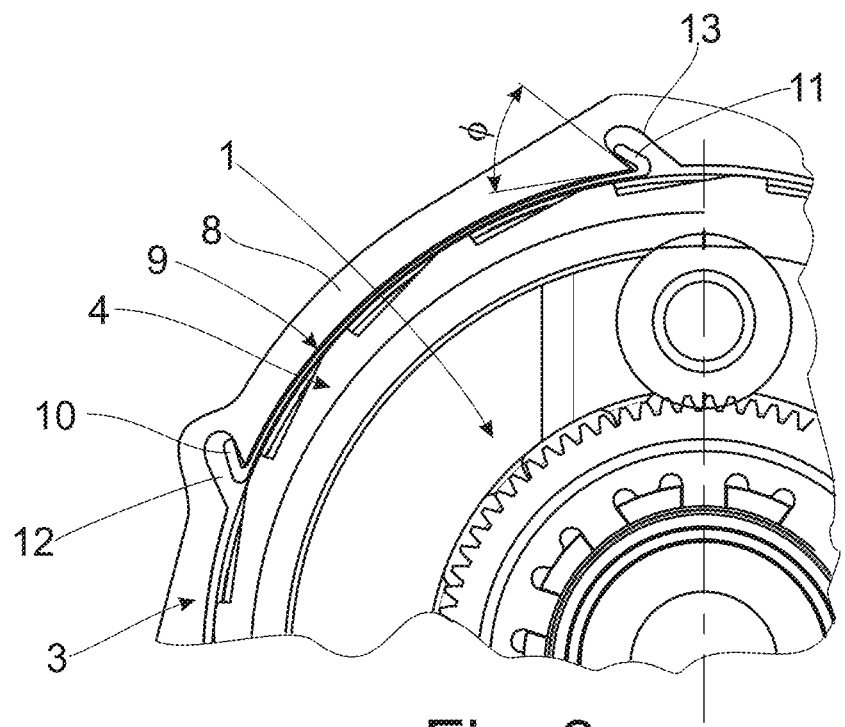
FIG. 3 shows a schematic part view according to FIG. 2 of the arrangement with an alternative example embodiment of a fastening of the push-in element on the housing.
Figure 4:
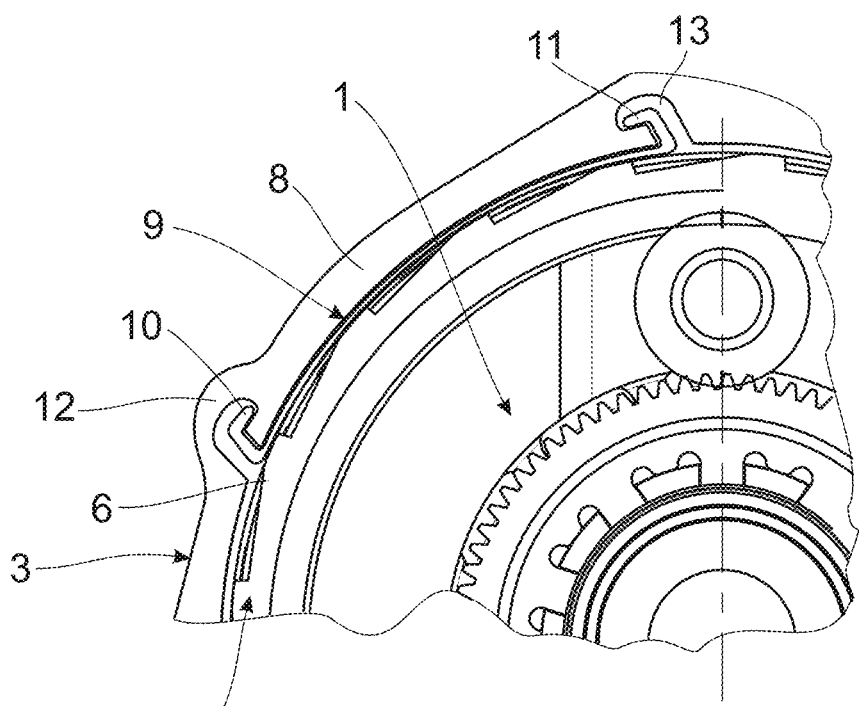
FIG. 4 shows a schematic part view according to FIG. 2 of the arrangement with yet another alternative example embodiment of the fastening of the push-in element on the housing.

In FIGS. 2 through 4 a preferred example embodiment of the provided support region in the form of a ring segment-shaped push-in element 9 more or less in the form of a spring clamp or the like is shown as an example.

The push-in element 9 extends symmetrically along the contact region 14 between the brake ring 4 and the inner wall 8 of the housing 3. In order to secure the push-in element 9, the end portions 10, 11 thereof are correspondingly bent in order to be secured directly in the housing 3 in assigned retaining grooves 12, 13. Preferably, the push-in element 9 is elastic, so that a preloading wedging of the push-in element 9 in the two retaining grooves 12, 13 can be achieved. The push-in element 9 therefore extends along the contact region 14 and covers the contact region 14 completely.

According to example aspects the invention, the push-in element 9, or the spring clamp, when not installed, has a pre-curvature which is adapted specifically to the installed state, so that the spring clamp, when installed and elastically bent upwards, has the necessary curvature at the inner wall 8 of the housing 3 and an elastic springing with respect to the retaining grooves 12, 13 in order to be retained at the housing 3 in a friction-locking and/or interlocking manner depending on the shape of the groove.

As is apparent, in particular, from FIG. 3, the retaining grooves 12, 13 are formed at a predetermined wedge angle $\phi$ to the inner radius of the inner wall 8 of the housing 3, so that the end portions 10, 11 of the push-in element 8, which are bent at the corresponding angle $\phi$, are retained with an appropriate preload.

FIG. 4 shows an example embodiment in which the end portions 10, 11 are bent twice and the retaining grooves 12, 13 are correspondingly adapted to the twice-bent end portions 10, 11, such that, in addition to the friction-locking fastening, an interlocking fastening of the end portions 10, 11 of the push-in element 9 in the retaining grooves 12, 13 is also achieved.

Regardless of the particular example embodiment of the retaining grooves 12, 13, the retaining grooves 12, 13 may be introduced into the housing 3 in the casting process. It is also conceivable that the retaining grooves 12, 13 are produced by machining the housing 3. The push-in element 9 is installed either by being inserted axially into the retaining grooves 12, 13 of the housing 3 or by being snapped in radially from the outside. The push-in element 9 is secured against migrating laterally outward via a cover, or the like, which has been screwed onto the housing 3.

As an alternative or in addition to the push-in element 9 in the form of a support region, the sleeve 18, which is shown, or a bore can be provided directly in the housing 3, which is made of an aluminum alloy, and the inner surface of the housing bore can be in the form of a coating which has been hardened on the surface or provided via hard anodizing.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 bottom bracket gearbox
2 bicycle or pedelec
3 housing, or bottom bracket housing
4 shift ring, or brake ring
5 shift pawl, or brake pawl
6 outer toothing
7 oil sump
8 inner wall of the housing
9 push-in element
10 end portion of the push-in element
11 end portion of the push-in element
12 retaining groove in the housing
13 retaining groove in the housing
14 contact region, or support region, between brake ring and housing
15 touch region between outer toothing and brake pawl
16 reaction force
17 shift drum
18 sleeve
19 pin
$\phi$ wedge angle of the retaining groove

The invention claimed is:

1. An arrangement for actuating a shift element for a bottom bracket gearbox (1), comprising:
    a shift ring (4) rotatably mounted in a housing (3) and assigned to a gearbox component;
    a shift pawl (5) for locking or releasing the shift ring (4), the shift pawl (5) assigned to the shift ring (4) for shifting a gear stage,
    wherein a support region mechanically reinforces the housing (3), the support region provided at least along a contact region (14) between an inner wall (8) of the housing (3) and an outer circumference of the shift ring (4), the contact region (14) defined by reaction forces (16) acting when the shift ring (4) is locked.

2. The arrangement of claim 1, wherein the support region comprises a sleeve (18) fastened on the inner wall (8) of the housing (3), the sleeve (18) closed over a circumference of the sleeve (18).

3. The arrangement of claim 2, wherein the sleeve (18) is press-fit or thermally integrated into the housing (3).

4. The arrangement of claim 2, further comprising an acoustic damping region provided between the sleeve (18) and the inner wall (8) of the housing (3).

5. The arrangement of claim 4, wherein the acoustic damping region between the sleeve (18) and the inner wall (8) of the housing (3) comprises an elastomer vulcanized directly onto the sleeve (18).

6. The arrangement of claim 2, wherein a central axis of an inner contour of the sleeve (18) is situated with respect to the shift ring (4) coaxially or off-center by an average play between the shift ring (4) and the inner wall (8) of the housing (3).

7. The arrangement of claim 1, wherein the support region comprises a coating provided on the inner wall (8) of the housing (3), the coating increases a surface hardness of the inner wall (8) of the housing (3).

8. The arrangement of claim 1, wherein the support region comprises a ring segment-shaped push-in element (9).

9. The arrangement of claim 8, wherein the push-in element (9) is made of hardened spring steel.

10. The arrangement of claim 8, further comprising an acoustic damping region provided between the push-in element (9) and the inner wall (8) of the housing (3).

11. The arrangement of claim 10, wherein the acoustic damping region between the sleeve (18) and the inner wall (8) of the housing (3) comprises an elastomer vulcanized directly onto the push-in element (9).

12. The arrangement of claim 8, wherein a central axis of an inner contour of the sleeve (18) is situated with respect to the push-in element (9) coaxially or off-center by an average play between the shift ring (4) and the inner wall (8) of the housing (3).

13. The arrangement of claim 8, wherein dimensions of the push-in element (9) are selected such that at least the contact region (14) between outer toothing (6) of the shift ring (4) and the inner wall (8) of the housing (3) is covered, and the contact region (14) arises at an angle of ninety degrees away from a touch region (15) between the shift pawl (5) and the outer toothing (6) of the shift ring (5) when the shift pawl (5) is engaged.

14. The arrangement of claim 13, wherein end portions (10, 11) of the push-in element (9) are bent and are fastenable in corresponding retaining grooves (12, 13) in the inner wall (8) of the housing (3).

15. The arrangement of claim 14, wherein the retaining grooves (12, 13) and the end portions (10, 11) of the push-in element (9) are formed at a predetermined wedge angle ($\phi$) to an inner radius of the inner wall (8) of the housing (3).

16. The arrangement of claim 1, wherein:
the shift element comprises a brake shift element;
the shift ring (4) comprises a rotatably mounted brake ring;
the shift pawl (5) comprises a brake pawl rotatably mounted via a pin (19); and
the brake ring is lockable in one direction of rotation via the brake pawl.

17. A bottom bracket gearbox (1), comprising at least one of the arrangement of claim 1.

18. A bicycle or pedelec (2), comprising the bottom bracket gearbox (1) of claim 17.

* * * * *